Nov. 17, 1959  E. GINN  2,912,936
ENGINE COOLING SYSTEM
Filed Jan. 3, 1956  2 Sheets-Sheet 1
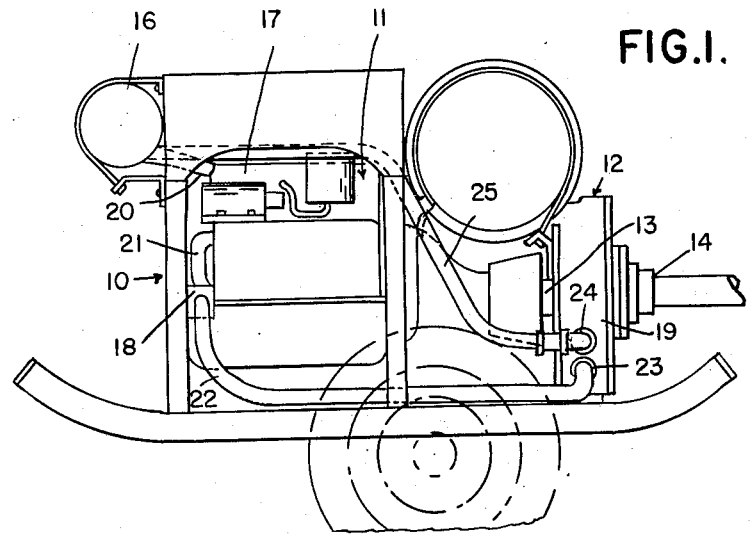
FIG.1.
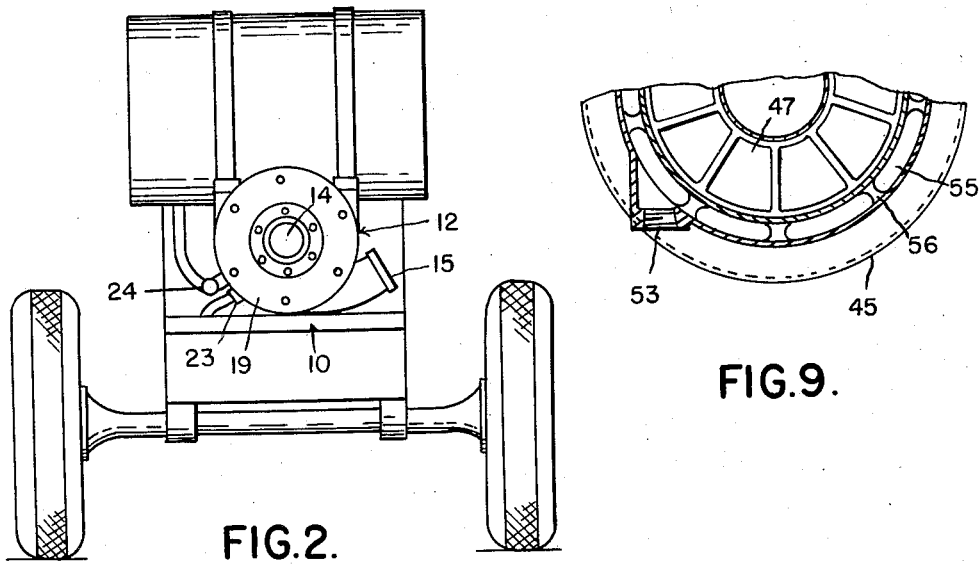
FIG.2.
FIG.9.
INVENTOR.
EARL GINN
BY Hauke & Hardesty
ATTORNEYS Nov. 17, 1959
E. GINN
2,912,936
ENGINE COOLING SYSTEM
Filed Jan. 3, 1956
2 Sheets-Sheet 2
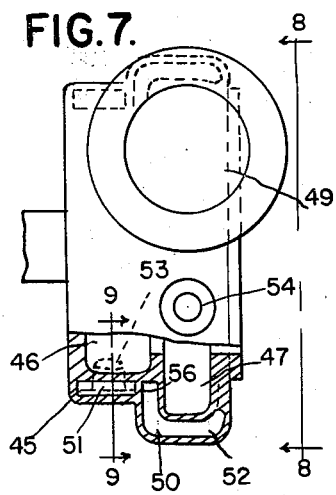
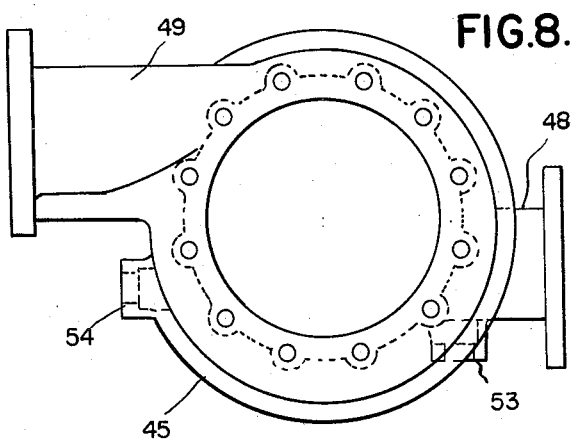
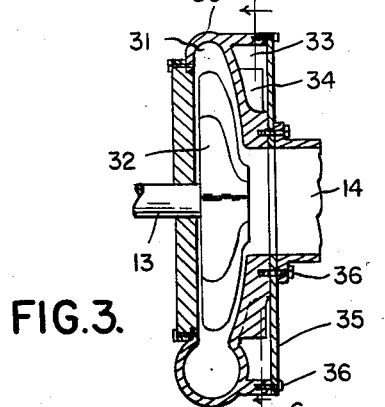
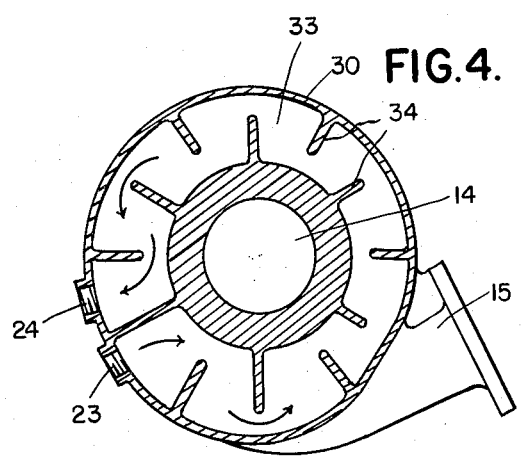
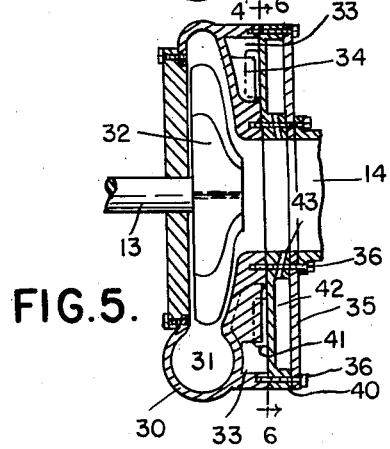
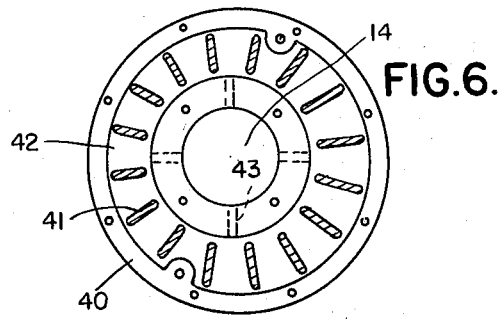
INVENTOR.
EARL GINN
BY
Hauke + Hardesty
ATTORNEYS United States Patent Office 2,912,936
Patented Nov. 17, 1959

2,912,936

ENGINE COOLING SYSTEM

Earl Ginn, Muskegon, Mich., assignor to Continental Motors Corporation, Muskegon and Detroit, Mich., a corporation of Virginia Application January 3, 1956, Serial No. 557,041

9 Claims. (Cl. 103—87)

This invention relates to engine cooling systems, and more particularly to a cooling system for an internal combustion engine and water pump assembly utilizing the water pump as a heat exchanger for the engine coolant.

Engine and water pump assemblies, such as the type used for irrigation and for well pumping, have heretofore utilized conventional types of cooling systems having air-cooled radiators through which the engine coolant is circulated. Since the engines are operated while standing still over relatively long periods of time and often in hot climates, the problem of preventing overheating of the engine is quite serious. The machine must be so placed as to have a sufficient supply of air, a large fan and radiators must be used, and the engine is generally left as exposed to the air as possible in order to provide adequate dissipation of the heat. The resultant load on the engine makes for more costly operation, and the exposure to weather reduces the useful life of the engine.

An object of the present invention is to provide a self-contained cooling system for engine and water pump assemblies by utilizing the water flowing through the pump as a heat absorbing agent.

Another object of the invention is to increase the efficiency of engine and water pump assemblies by providing a simplified cooling system utilizing the water pump as a heat exchanger for the engine coolant.

A further object of the invention is to improve the cooling system of an engine and water pump assembly by constructing a water pump having a jacket through which engine coolant is circulated and cooled.

For a more complete understanding of the invention, reference may be had to the accompanying drawings illustrating several preferred embodiments of the invention in which like characters refer to like parts throughout the several views and in which:

Fig. 1 is a side elevational view of an internal combustion engine and water pump assembly embodying the invention.

Fig. 2 is an end view of the assembly of Fig. 1 as seen from the right side.

Fig. 3 is a cross sectional view through the water pump of Fig. 1.

Fig. 4 is a sectional view taken on the line 4—4 of Fig. 3.

Fig. 5 is a modification of the water pump illustrated in Fig. 3.

Fig. 6 is a view taken on the line 6—6 of Fig. 5.

Fig. 7 is a side elevational view, partly in section, of another type of water pump construction embodying the invention.

Fig. 8 is a view taken on the line 8—8 of Fig. 7, and Fig. 9 is a fragmentary view taken on the line 9—9 of Fig. 7.

The drawings illustrate an engine and water pump assembly 10, preferably comprising an internal combustion engine 11 and a centrifugal type water pump 12 connected to the engine 11 by a drive shaft 13. The water pump 12 has an inlet 14 and an outlet 15.

The engine cooling system comprises a coolant supply tank 16, an engine coolant jacket 17, a coolant pump 18, and a water pump coolant packet 19. Coolant is preferably gravity fed to the engine jacket 17 from the tank 16 through pipe 20. After absorbing the engine heat, the coolant is drawn off through pipe 21 to the coolant pump 18, and is pumped through pipe 22 to a coolant intake 23 at the water pump jacket 19. The coolant is circulated through the pump jacket 19, permitting the heat to be absorbed by the water flowing through the pump 12, and then passes through an outlet 24 into a return pipe 25 and is returned to the coolant tank 16.

The structure of one preferred type of water pump illustrated in Figs. 3 and 4 comprises a cast housing 30 having a central pump chamber 31 in which a centrifugal pump rotor 32 is rotatably mounted and driven by the drive shaft 13. Water is drawn in through the central inlet 14 and is pumped through the outlet 15. The housing 30 includes a jacket portion 33 surrounding the inlet 14 and is provided with baffles 34 cast integrally therewith and extending into the jacket portion 33. A cover plate 35 is secured to the housing 30 by bolts 36 or other means to enclose the jacket. The engine coolant from the intake 23 circulates through the jacket 33 and around the baffles 34 as indicated by the directional arrows in Fig. 4. The circulation of coolant thus induced through the pump jacket 33 is directed toward achieving the greatest efficiency of heat exchange to the flowing water before being piped back to the coolant supply tank 16.

A further modification of this type of heat exchange system is illustrated in Figs. 5 and 6. Essentially, the parts are the same, except that an additional member 40 is sandwiched between the pump jacket 33 and the cover plate 35. A plurality of vanes or baffles 41 are integrally cast on one face of the member 40 and are adapted to project into the spaces between the jacket baffles 34. The member 40 provides an auxiliary water chamber 42, into which are bored a plurality of ports 43 from the pump inlet 14. These ports 43 are angled in the direction of water flow so that water from the inlet 14 will be forced to circulate in the chamber 42. Additional heat from the coolant circulating through the jacket 33 will be transferred by the baffles 41 and the casting member 40 to the water in the chamber 42, increasing the heat exchange capacity without increasing operating load or reducing the pump output.

A different type of water pump incorporating the invention is illustrated in Figs. 7, 8 and 9.

A housing 45 comprises interconnected pump chamber 46 and 47, a side water inlet 48 to chamber 46 and a water outlet 49 from chamber 47. A circumferential coolant jacket 50 surrounds the pump chambers 46 and 47 and is integrally cast with the pump housing 45. The jacket 50 comprises a pair of interconnected annular passages 51 and 52 respectively circumferential to chambers 46 and 47. A coolant intake 53 is connected to passage 51 and an outlet 54 is connected to passage 52. The passages 51 and 52 are openly connected by openings 55 in the separating wall 56 as shown in Fig. 9. The coolant is pumped into the passage 51 through the intake 53 in a direction substantially tangential to the pump housing 45, circulates around the passage 51 and through the openings 55 into the passage 52 and then through the outlet 54. The heat is transferred through the casting to the water flowing through the pump chambers 46 and 47.

Although I have described only a few embodiments of the invention, it will be apparent to one skilled in the art to which the invention pertains that various changes and modifications may be made therein without departing from the spirit of the invention or the scope of the appended claims.

I claim:

1. An engine and water pump assembly comprising an internal combustion engine having a jacket through which a coolant is circulated, a water pump driven by said engine and provided with an integrally constructed and arranged pump casing and engine coolant cooling jacket, said casing having a pump chamber and pumping means operable in same, said chamber and said water pump jacket having a common wall and being in heat exchange relation therewith, means connecting said engine and water pump jackets in series, and means circulating the engine coolant through said water pump jacket in heat exchange relation with said common wall and said pump casing to cool said engine coolant.

2. An engine and water pump assembly comprising an internal combustion engine having a jacket through which a coolant is circulated, a water pump driven by said engine and comprising a housing having a pump chamber, an inlet and an outlet to said chamber, pumping means driven by said engine and operable in said chamber, and an engine coolant cooling jacket integrally constructed with said housing and integrally arranged in heat exchange relation with said pump chamber, means connecting said engine and pump jackets, and means circulating engine coolant through said pump jacket to cool said engine coolant.

3. An engine and water pump assembly comprising an internal combustion engine having a jacket through which a coolant is circulated, a water pump driven by said engine and comprising a housing having a pump chamber, an inlet and an outlet to said chamber, pumping means driven by said engine and operable in said chamber, and an engine coolant cooling jacket integrally constructed with said housing and integrally arranged in heat exchange relation with said pump chamber, means connecting said engine and pump jackets, and means circulating engine coolant through said pump jacket to cool said engine coolant, said pump jacket being disposed directly adjacent to one face of said pump chamber, a coolant intake and outlet openly communicating with said cooling jacket, and baffles in said cooling jacket arranged to cause the coolant to circulate throughout said jacket in a tortuous path in heat exchange relation with the aforesaid face of said pump chamber.

4. An engine and water pump assembly comprising an internal combustion engine having a jacket through which a coolant is circulated, a water pump driven by said engine and comprising a housing having a pump chamber, an inlet and an outlet to said chamber, pumping means driven by said engine and operable in said chamber, and an engine coolant cooling jacket integrally constructed with said housing and integrally arranged in heat exchange relation with said pump chamber, means connecting said engine and pump jackets, and means circulating engine coolant through said pump jacket to cool said engine coolant, said pump jacket being disposed directly adjacent to one face of said pump chamber, a coolant intake and outlet openly communicating with said cooling jacket, and baffles in said cooling jacket arranged to cause the coolant to circulate throughout said cooling jacket in a tortuous path in heat exchange relation with the aforesaid face of said pump chamber, and a second structure integrally carried by the water pump housing and having an auxiliary water jacket openly connected to said pump water inlet, said engine coolant cooling jacket substantially sandwiched between said pump chamber and said auxiliary water jacket.

5. An engine and water pump assembly comprising an internal combustion engine having a jacket through which a coolant is circulated, a water pump driven by said engine and comprising a housing having a pump chamber, an inlet and an outlet to said chamber, pumping means driven by said engine and operable in said chamber, an engine coolant cooling jacket integrally constructed with said housing and integrally in heat exchange relation with said pump chamber, means connecting said engine and pump jackets, and means circulating engine coolant through said pump jacket to cool said engine coolant, said pump jacket being disposed directly adjacent to one face of said pump chamber, a coolant intake and outlet openly communicating with said cooling jacket, and baffles in said cooling jacket arranged to cause the coolant to circulate throughout said cooling jacket in a tortuous path in heat exchange relation with the aforesaid face of said pump chamber, and a second structure integrally carried by the water pump housing and having an auxiliary water jacket openly connected to said pump water inlet, said engine coolant cooling jacket substantially sandwiched between said pump chamber and said auxiliary water jacket, said second structure provided with baffles extending into said engine coolant cooling jacket and disposed in heat exchange relation to the coolant circulating therein.

6. An engine and water pump assembly comprising an internal combustion engine having a jacket through which a coolant is circulated, a water pump driven by said engine and comprising a housing having a pump chamber, a water inlet and a water outlet to said chamber, pumping means driven by said engine and operable in said chamber, an engine coolant cooling jacket integrally constructed with said housing and integrally arranged in heat exchange relation with said pump chamber, means connecting said engine and pump jackets, and means circulating engine coolant thorugh said pump jacket to cool said engine coolant, said water inlet opening substantially centrally into one face of said pump chamber, said pump coolant cooling jacket comprising a chamber circumferentially disposed around said water inlet and directly adjacent to said face of said pump chamber.

7. An engine and water pump assembly comprising an internal combustion engine having a jacket through which a coolant is circulated, a water pump driven by said engine and comprising a housing having a pump chamber, a water inlet and a water outlet to said chamber, pumping means driven by said engine and operable in said chamber, an engine coolant cooling jacket integrally constructed with said housing and integrally in heat exchange relation with said pump chamber, means connecting said engine and pump jackets, and means circulating engine coolant through said pump jacket to cool said engine coolant, said water inlet opening substantially centrally into one face of said pump chamber, said coolant cooling jacket comprising a chamber circumferentially disposed around said water inlet and directly adjacent to said face of said pump chamber, a coolant intake and outlet openly communicating with said cooling jacket chamber, and baffles in said cooling jacket chamber constructed and arranged to cause the coolant to circulate throughout said cooling jacket chamber in a tortuous path in heat exchange relation with the aforesaid face of said pump chamber.

8. An engine and water pump assembly comprising an internal combustion engine having a jacket through which a coolant is circulated, a water pump driven by said engine and comprising a housing having a pump chamber, an inlet and an outlet to said chamber, pumping means driven by said engine and operable in said chamber, an engine coolant cooling jacket integrally constructed with said housing and integrally arranged in heat exchange relation with said pump chamber, means connecting said engine and pump jackets, and means circulating engine coolant through said pump jacket to cool said engine coolant, said pump jacket disposed circumferentially around said pump chamber in direct heat exchange relation with the outer circumference of said pump chamber.

9. An engine and water pump assembly comprising an internal combustion engine having a jacket through which a coolant is circulated, a water pump driven by said engine and comprising a housing having a pump chamber, an inlet and an outlet to said chamber, pumping means driven by said engine and operable in said chamber, an engine coolant cooling jacket integrally constructed with said housing and integrally arranged in heat exchange relation with said pump chamber, means connecting said engine and pump jackets, and means circulating engine coolant through said pump jacket to cool said engine coolant, said pump jacket disposed circumferentially around said pump chamber, said pump chamber separated into two interconnected sections, said pump jacket comprising two interconnected passages disposed respectively circumferential to said sections in direct heat exchange relation with the outer circumference of said pump chamber sections, and a coolant intake and outlet openly communicating relatively with said passages.

References Cited in the file of this patent

UNITED STATES PATENTS

| | | |
|---|---|---|
| 1,113,873 | Boring | Oct. 13, 1914 |
| 1,731,572 | Holdsworth | Oct. 15, 1929 |
| 1,826,040 | Beimling et al. | Oct. 6, 1931 |
| 2,566,506 | Thieszen | Sept. 4, 1951 |